Dec. 25, 1928.  1,696,535
J. GOULDBOURN
CONTROLLING MECHANISM
Filed Oct. 26, 1926
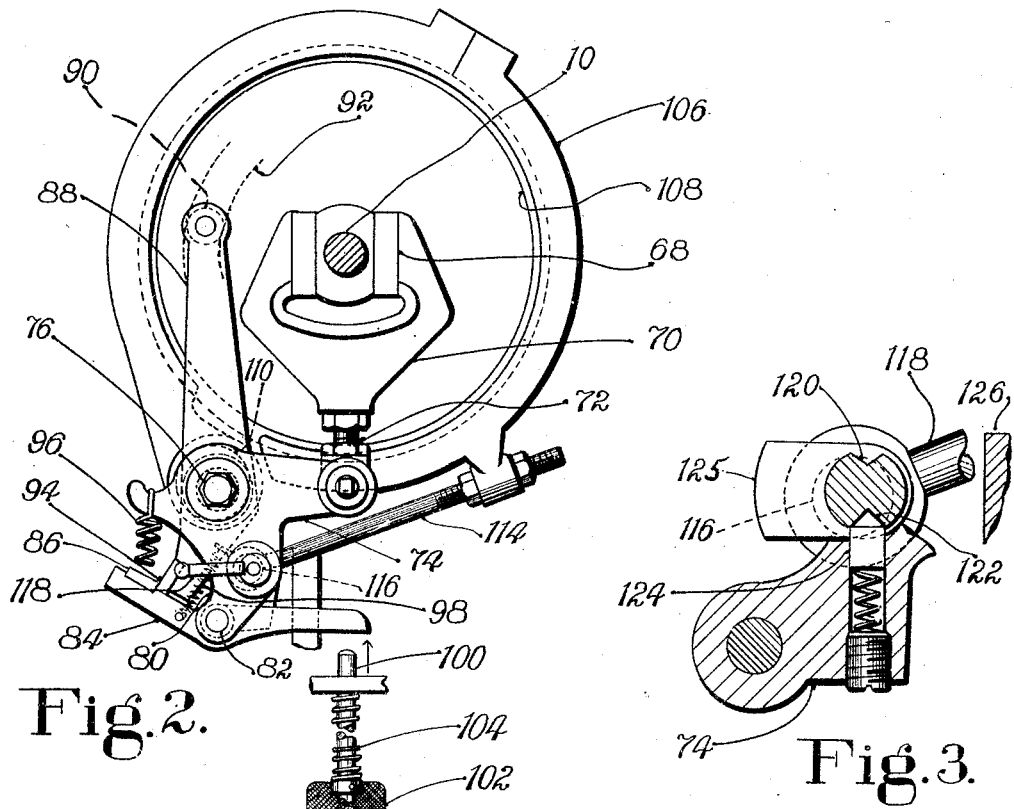
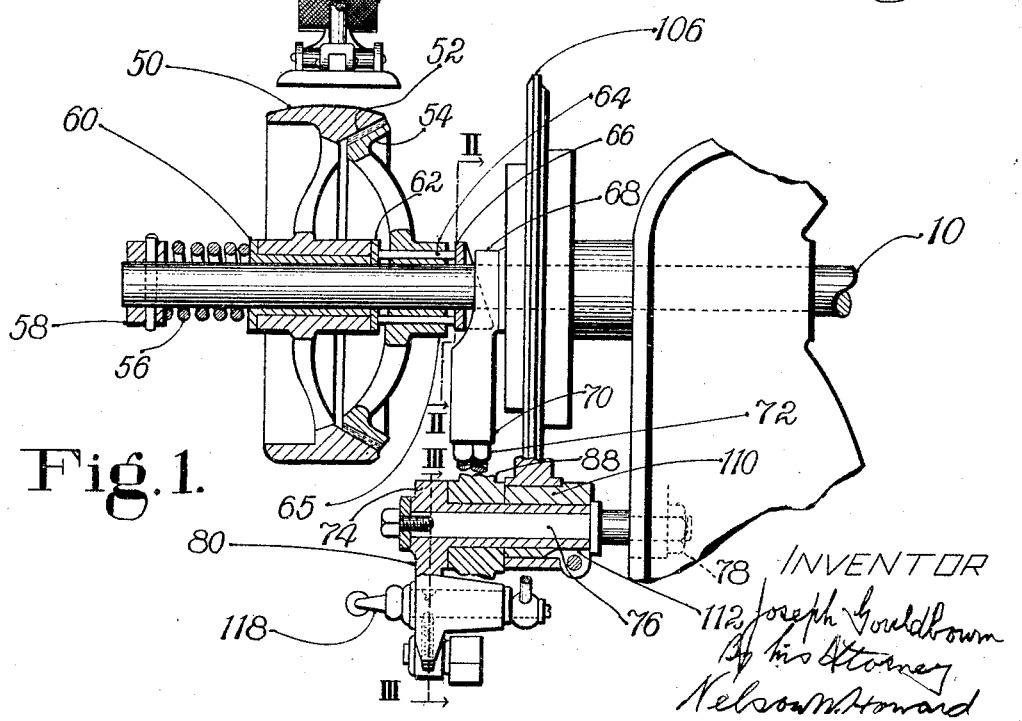
INVENTOR
Joseph Gouldbourn
By his Attorney
Nelson W. Howard Patented Dec. 25, 1928.

1,696,535

UNITED STATES PATENT OFFICE.

JOSEPH GOULDBOURN, OF LEICESTER, ENGLAND, ASSIGNOR TO UNITED SHOE MACHINERY CORPORATION, OF PATERSON, NEW JERSEY, A CORPORATION OF NEW JERSEY.

CONTROLLING MECHANISM.

Application filed October 26, 1926, Serial No. 144,363, and in Great Britain November 6, 1925.

This invention relates to controlling mechanisms and is illustrated as applied to a clutch operating or controlling mechanism adapted, for example, for use in a fastening-inserting machine.

In many kinds of machinery, of which loose nailing and other fastening inserting machines are examples, it is desired, when a number of cycles of operation of the machine have been completed, to bring the machine to rest at a definite point in its cycle of operation. For this purpose manually controlled but mechanically timed and operated clutch releasing and brake applying mechanism has frequently been used. It is an object of the present invention to provide an improved simple and inexpensive but at the same time effective and reliable mechanism for this purpose. With this object in view, the illustrated mechanism comprises relatively movable driving and driven clutch members, a spring tending to move one of these clutch members toward the other, a pair of relatively movable wedge members by means of which one of the clutch members can be moved against the force of the spring, and means for moving one of the wedge members, which may be designated as the clutch controlling member, alternatively in a direction to disengage the clutch members against the force of the spring at a definite point in the cycle of operation of the machine to stop the transmission of power or to permit the spring to move one of the clutch members into engagement with the other so that power may be transmitted. Preferably and in the illustrated embodiment of the invention, this clutch controlling member is moved by a lever latched, when the machine is at rest, in a position to hold the clutch disengaged and movable by a spring, when the latch is tripped, to permit the clutch member moving spring to cause engagement of the clutch members thereby starting the machine. When the machine is to be brought to rest, the lever referred to above is rocked to clutch releasing position by bringing its latch member into the path of movement of the end of a second lever rocked by a power driven cam, thereby rocking the first lever, disengaging the clutch members and applying a brake at a definite point in the cycle of operation determined by the form of the cam.

With the above and other objects in view, the invention will now be described with reference to the accompanying drawings and pointed out in the claims.

In the drawings,

Fig. 1 is a side elevation, with certain parts in section, of controlling mechanism embodying this invention;

Fig. 2 is a transverse section on the line II—II of Fig. 1; and

Fig. 3 is a detail sectional view on the line III—III of Fig. 1.

The illustrated mechanism comprises improved clutch controlling means by which a shaft 10 may be driven or caused to come to rest at a definite point in its cycle of operation as may be desired. Accordingly shaft 10 has rotatably mounted upon it a driving pulley 50 (Fig. 1) which, when the machine is to be driven, is moved axially of the shaft, to cause a clutch surface 52 formed thereon to engage with a corresponding clutch surface of a clutch member 54 fixed upon shaft 10. A spring 56 surrounding shaft 10 bears at one end upon a collar 58 secured to shaft 12 and at the other upon a sleeve 60 keyed to shaft 10 and forming a bearing for pulley 50. At the opposite end of the sleeve 60 is a washer 62 against which bear the ends of a plurality of rods 64 mounted in the hub 65 of the clutch member 54. The rods 64 also bear upon the forward end of a wedge member or block 66 slidably mounted on shaft 10. The wedge member 66 is engaged by a second wedge member 68 which serves as a clutch controlling member and is mounted for movement transversely of shaft 10 upon a yoke member 70. Thus, when yoke member 70 is moved downwardly, wedge member 68 will force wedge member 66 to the left, as viewed in Fig. 1, thus pushing rods 64, washer 62, sleeve 60 and pulley 50 to the left against the compression of spring 56 and disengaging the clutch surfaces of clutch members 50 and 54 so that shaft 10 is no longer driven. On the other hand, when yoke member 70 is moved upwardly the upward movement of the second wedge member 68 permits wedge member 66 to be moved to the right, permitting spring 56 to force sleeve 60 and pulley 50 to the right so that the clutch surfaces of clutch members 52 and 54 engage and power is transmitted to shaft 10.

Yoke 70, carrying the clutch controlling wedge member 68, is pivotally connected at its lower end by a link 72 with a lever 74 fulcrumed upon a shaft 76 carried at 78 by the frame of the machine. Lever 74 has a downwardly extending arm 80 (Figs. 1 and 2) to which is pivoted at 82 a latch member 84, at the left-hand end of which is a hardened latch block 86. Fulcrumed concentrically with lever 74 is a second lever 88 extending approximately vertically and carrying at its upper end a cam roll 90 operating in a cam track 92 formed in a cam carried by the shaft 10. At its lower end lever 88 is provided with a hardened latch block 94 arranged when the machine is at rest to engage with latch block 86, as shown in Fig. 2, thus holding lever 74 in the position shown in that figure with the yoke 70 depressed so that the clutch is disengaged. A tension spring 96 tends to rock lever 74 in a counterclockwise direction, as shown in Fig. 2, while a second spring 98 tends to rotate latch member 84 in a clockwise direction. A rod 100 movable upwardly by a treadle 102 and downwardly by a spring 104 when the treadle is released is moved upwardly against the tail of latch 84 when the machine is to be started. Thus block 86 is moved downwardly so that lever 74 is released and is rotated in a counterclockwise direction by spring 96. This forces yoke 70 and the clutch controlling wedge member 68 upwardly, permitting movement of wedge 66 to the right, as viewed in Fig. 1, under the influence of spring 56 so that, as hereinbefore set forth, shaft 10 is driven by the clutch. When the treadle is released, however, to stop the machine, the rod 100 descends and latch member 84 is rotated in a clockwise direction by spring 98. Lever 88, which oscillates idly while the machine is running until after the treadle is released, moves in such a path that block 94 engages block 86 at a definite point in the cycle of operation after rod 100 has been lowered, so that lever 74 is rocked by lever 88, forcing yoke 70 and wedge member 68 downwardly and thereby moving wedge 66 to the left, compressing spring 56 and disengaging the clutch members.

In order to bring the machine to rest promptly after the clutch is disengaged a brake band 106 is provided engaging a brake drum 108 fast upon cam shaft 10. Brake band 106 engages drum 108 through almost its entire periphery. In order to tighten brake band 106 upon drum 108 the left end of brake band 106 (as viewed in Fig. 2) is mounted upon an eccentric 110 (Figs. 1 and 2) fixed to a sleeve 112 projecting from and coaxial with the hub of clutch lever 74 so that as the clutch lever 74 is rocked to disengage the clutch, eccentric 110 is rotated to move the left-hand end of brake band 106 into engagement with drum 108. The other end of brake band 106 is connected by an adjustable rod 114 to clutch lever 74 so that as the clutch lever moves to disengage the clutch it will also pull the right-hand end of brake band 106 into engagement with brake drum 108. Since the lever 88 is operated by a closed cam the brake is positively applied and may be adjusted by adjusting the connection of brake band 106 to rod 114.

To release the brake and permit cam shaft 10 to be rotated, if desired, while the machine is at rest, the end of the rod 114 remote from brake band 106 is mounted on an eccentric stud 116 which may be rotated by a hand lever 118 connected thereto provided for that purpose. Eccentric stud 116 is provided with a pair of notches or recesses 120, 122 (Fig. 3) either one of which may be engaged by a spring-pressed plunger 124 mounted in the lever 74 to hold the stud 116 in either brake applying or brake releasing position. To prevent accidental engagement of the clutch when the brake is thus released eccentric stud 116 has fixed to it a cam or stop member 125 which, when the stud is rotated to release the brake, is moved against a fixed abutment 126 to prevent movement of clutch lever 74 in a direction to allow the clutch members to engage.

Having thus described my invention, what I claim as new and desire to secure by Letters Patent of the United States is:—

1. Clutch mechanism comprising a shaft, a clutch member fixed upon the shaft, a driven member slidably mounted upon the shaft and provided with a clutch surface arranged for movement into and out of engagement with the clutch member fast upon the shaft, a spring tending to urge the slidably mounted clutch member toward the clutch member fixed upon the shaft, a wedge member slidably mounted on the shaft, connections between said wedge member and the slidably mounted clutch member whereby movement of the wedge member along the shaft operates to force the slidably mounted clutch member away from the other clutch member against the spring, a second wedge member engaging the first wedge member, and means for moving the second wedge member transversely of the shaft thereby forcing the first wedge member lengthwise of the shaft against said spring to disconnect the clutch and permitting its return by said spring to render the clutch operative to transmit power.

2. Clutch mechanism comprising a pair of clutch members, a pair of wedges arranged by relative movement to throw one of the clutch members into and out of power transmitting position, a lever connected to one of said wedges and arranged by rocking movement about its fulcrum to move said wedge, a spring tending to rock said lever into position to move said one of the clutch members to power transmitting position, a second lever, a pair of latch members carried by the respective levers and arranged when in engagement to latch the first lever in position to hold the clutch disengaged, and manually operated means for tripping the latch members to cause the first lever to be rocked by its spring to move the wedge member connected to said lever into position to cause the clutch members to engage.

3. Clutch mechanism comprising a pair of relatively movable clutch members, a spring tending to cause engagement of said clutch members, a lever arranged by rocking movement in one direction to permit the spring to cause engagement of said clutch members and in the opposite direction to disengage the clutch members against the opposition of the spring, a spring tending to rock said lever in the direction to cause power transmitting engagement of the clutch members, a latch arranged to hold the lever against the last-named spring in position to prevent the transmission of power, manually operated means for tripping said latch, whereby said lever is rocked by said last-named spring and the clutch members are brought into power transmitting engagement, and means controlled by the driven clutch member arranged when the latch is released to rock said lever in a direction to render the clutch inoperative to transmit power.

4. Clutch mechanism comprising a pair of relatively movable driving and driven clutch members, a brake operatively connected to the driven clutch member, a lever arranged by rocking movement in one direction to cause engagement of the clutch members and in the opposite direction to cause their disengagement, a spring tending to rock said lever in the direction to cause engagement of the clutch members thereby causing transmission of power by the clutch, a latch arranged to hold the lever against the power of said spring in position to prevent the transmission of power, means for tripping said latch whereby said lever is rocked by said spring and the clutch members are brought into power transmitting engagement, and means controlled by the driven clutch member arranged at a predetermined point in the cycle of rotation of the clutch member, when the latch is released, to rock said lever in a direction to disengage the clutch members and to apply the brake.

5. Clutch mechanism including a pair of clutch members relatively movable into engagement to transmit power, a pair of levers, connections from the first lever to one of the clutch members whereby rocking of that lever causes said one of the clutch members to move into and out of power transmitting engagement with the other, a latch comprising members carried by the respective levers arranged for mutual engagement when the machine is at rest to hold the levers in position to maintain the clutch members out of power transmitting engagement, means tending to rock the first lever into position to cause power transmitting engagement of the clutch members, manually operable means for tripping the latch to permit such movement of said first lever, and means driven by the clutch arranged periodically to rock the second lever and, when the means for tripping the latch is released, to cause the two latch members to engage and the second lever thereby to rock the first, thus disengaging the clutch members.

6. Clutch mechanism including a pair of clutch members relatively movable into engagement to transmit power, a pair of levers, connections from the first lever to one of the clutch members whereby rocking of that lever causes said one of the clutch members to move into and out of power transmitting engagement with the other, a latch comprising a member carried by each lever arranged for mutual engagement when the machine is at rest to hold the levers in position to maintain the clutch members out of power transmitting engagement, means tending to rock the first lever into position to cause power transmitting engagement of the clutch members, manually operable means for tripping the latch to permit such movement of said first lever, and a cam rotated by the driven clutch member when the clutch is transmitting power and arranged periodically to rock the second lever and, when the means for tripping the latch is released to cause the two latch members to engage and the second lever to rock the first, thus disengaging the clutch members at a predetermined point in the cycle of rotation of said cam.

7. Clutch mechanism comprising a pair of clutch members, a pair of wedges arranged by relative movement to cause engagement and disengagement of said clutch members, a lever connected to one of said wedges and arranged by rocking movement about its fulcrum to move said wedge, a spring tending to rock said lever into position to cause engagement of the clutch members, a second lever, a cam arranged to oscillate said second lever, a pair of latch members carried by the respective levers and arranged when in engagement to latch the first lever in position to disengage the clutch members, manually operated means for tripping the latch members to cause the first lever to be rocked by its spring to move the wedge member connected to said lever into position to disengage the clutch members, and a spring arranged upon the release of said manually operated means to move the latch member carried by the first-named lever into position to be engaged by the latch member carried by the second lever as the latter is rocked by its cam whereby the first lever is rocked to move the wedge connected thereto into position to disengage the clutch members.

8. Clutch mechanism comprising a shaft, a clutch member fixed upon the shaft, a second clutch member slidably mounted upon the shaft, means for driving said second clutch member, a spring tending to urge the slidably mounted clutch member along the shaft toward and into engagement with the clutch member fixed upon the shaft, a wedge member mounted for sliding movement on the shaft, a second wedge member co-operating therewith and arranged for movement transversely of the shaft in one direction to force the first wedge member lengthwise of the shaft and thereby to separate the clutch members against the compression of the spring and in another direction to permit movement of the second wedge member lengthwise of the shaft in the opposite direction, thereby causing the spring to force the driven clutch member lengthwise of the shaft to cause power transmitting engagement of the clutch members, a member connected to the second wedge member and arranged by its movement to force the second wedge member transversely of the shaft, manually controlled means for moving said member in a direction to render the clutch operative to transmit power, and power operated means for moving said member in the reverse direction to move the second wedge member in a direction to disengage the two clutch members and to cause cessation of the transmission of power.

9. Clutch mechanism comprising a shaft, a clutch member fixed upon the shaft, a second clutch member slidably mounted upon the shaft, means for driving said second clutch member, a spring tending to urge the slidably mounted clutch member along the shaft toward and into engagement with the clutch member fixed upon the shaft, a wedge member mounted for sliding movement on the shaft, a second wedge member co-operating therewith and arranged for movement transversely of the shaft in one direction to force the first wedge member lengthwise of the shaft in the direction of the second clutch member thereby to separate the clutch members against the spring and in the opposite direction to permit movement of the first wedge member away from the second clutch member thereby enabling the spring to force the second or driven clutch member lengthwise of the shaft to cause power transmitting engagement of the clutch members, a lever connected to the second wedge member and arranged by its rocking to move the second wedge member transversely of the shaft, manually controlled means for rocking said lever in a direction to render the clutch operative to transmit power, and power operated means for rocking said lever in the reverse direction to move the second wedge member in a direction to disconnect the two clutch members and cause cessation of the transmission of power.

10. Clutch mechanism comprising a shaft, a clutch member fixed upon the shaft, a power driven clutch member slidably mounted upon the shaft and provided with a clutch surface arranged for movement into and out of engagement with the clutch member fast upon the shaft, a spring tending to urge the slidably mounted clutch member toward the clutch member fixed upon the shaft, a wedge member slidably mounted on the shaft, connections between said wedge member and the slidably mounted clutch member whereby movement of the wedge member along the shaft operates to force the slidably mounted clutch member away from the other clutch member against the spring, a lever fulcrumed upon a stationary part of the machine having connected thereto a second wedge member movable by rocking of said lever into and out of position to force the first-named wedge member lengthwise of the shaft against the spring and to permit its return by said spring, a latch member carried by said lever, a second latch member co-operating with the first and arranged when the two are in engagement to hold the two wedge members in spring compressing clutch releasing position, a spring tending to move said lever in a direction to cause relative movement of said wedge members in a direction to permit the first-named spring to cause power transmitting engagement of the clutch members, and means for tripping one of said latch members whereby the clutch members are caused to engage.

11. A clutch controlling mechanism, having in combination, a clutch controlling member, two levers, a common fulcrum for said levers, the first of the levers being operatively connected to the clutch controlling member, a continuously operating cam for oscillating the second lever about the fulcrum, a latch mechanism for connecting the levers to move together, and means for rendering the latch mechanism either operative or inoperative.

12. A clutch controlling mechanism, having in combination, a clutch controlling member, two levers, a common fulcrum for said levers, the first of the levers being operatively connected to the clutch controlling member, a continuously operating cam for oscillating the second lever about the fulcrum, a latch mechanism for connecting the levers to move together, means for rendering the latch mechanism either operative or inoperative, and a brake mechanism connected with the first lever and arranged to be applied when the clutch controlling member is moved to release the clutch.

13. A clutch controlling mechanism, having in combination, a clutch controlling member, two levers, a common fulcrum for said levers, the first of the levers being operatively connected to the clutch controlling member, a continuously operating cam for oscillating the second lever about the fulcrum, a latch mechanism for connecting the levers to move together, means for rendering the latch mechanism either operative or inoperative, a brake mechanism connected with the first lever and arranged to be applied when the clutch controlling member is moved to release the clutch, and an operator-controlled eccentric mechanism for releasing the brake and simultaneously preventing movement of the clutch controlling member to a position to cause engagement of the clutch.

In testimony whereof I have signed my name to this specification.

JOSEPH GOULDBOURN.